United States Patent
Kim et al.

(10) Patent No.: US 7,826,821 B2
(45) Date of Patent: Nov. 2, 2010

(54) EMERGENCY MESSAGE TRANSMISSION METHOD AND MOBILE TERMINAL

(75) Inventors: Sang Don Kim, Suwon-si (KR); Jin Ho Jang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 737 days.

(21) Appl. No.: 11/706,841

(22) Filed: Feb. 15, 2007

(65) Prior Publication Data

US 2008/0003975 A1    Jan. 3, 2008

(30) Foreign Application Priority Data

Jun. 30, 2006    (KR) ...................... 10-2006-0060754

(51) Int. Cl.
H04M 1/04    (2006.01)

(52) U.S. Cl. ................. 455/404.1; 455/410; 455/404.2; 455/466

(58) Field of Classification Search ................. 455/404, 455/404.1, 404.2, 466
See application file for complete search history.

(56) References Cited

U.S. PATENT DOCUMENTS

| | | | | |
|---|---|---|---|---|
| 6,879,570 | B1 * | 4/2005 | Choi | 370/329 |
| 7,058,385 | B2 * | 6/2006 | Lauper | 455/404.1 |
| 7,076,235 | B2 * | 7/2006 | Esque et al. | 455/404.1 |
| 7,212,111 | B2 * | 5/2007 | Tupler et | 340/539.18 |
| 7,590,246 | B2 * | 9/2009 | Calmels et al. | 380/270 |
| 2006/0229059 | A1 * | 10/2006 | Crago et al. | 455/404.2 |
| 2007/0173224 | A1 * | 7/2007 | Buckley et al. | 455/404.1 |

FOREIGN PATENT DOCUMENTS

GB    2250400 A    *    6/1992

* cited by examiner

*Primary Examiner*—Nick Corsaro
*Assistant Examiner*—Sowmini Nair
(74) *Attorney, Agent, or Firm*—The Farrell Law Firm, LLP

(57) ABSTRACT

A mobile terminal capable of emergency message transmission using Bluetooth® technology is disclosed. The mobile terminal includes a memory unit for storing a recipient list and a pre-composed emergency message; an input unit for inputting a command of emergency message transmission; a Bluetooth® module for discovering Bluetooth®-enabled devices within Bluetooth® range and for extracting a Bluetooth® address of the discovered Bluetooth®-enabled device when a Bluetooth®-enabled device is discovered; a controller for inserting the extracted Bluetooth® address into the emergency message; and a communication unit for transmitting the emergency message to a mobile terminal associated with the stored recipient list in response to input of a command of emergency message transmission. As a result, an emergency message is transmitted to a proximate Bluetooth®-enabled device for immediate help to the user.

17 Claims, 7 Drawing Sheets

EMERGENCY MESSAGE TRANSMISSION METHOD AND MOBILE TERMINAL

PRIORITY

This application claims priority to an application filed in the Korean Intellectual Property Office on Jun. 30, 2006 and assigned Serial No. 2006-0060754, the contents of which are incorporated herein by reference.

BACKGROUND OF THE INVENTION

1. Field of the Invention

The present invention relates generally to a mobile terminal capable of sending an emergency message using Bluethoth® communication and, more particularly, to a method and mobile terminal wherein emergency situations of a user carrying the mobile terminal can be transmitted to a proximate person for immediate help to the user.

2. Description of the Related Art

Nowadays, many people carry mobile terminals. However, when emergency situations occur, even a user carrying a mobile terminal may be pressed for time to place a call by inputting a desired phone number. Therefore a mobile terminal having an emergency message sending capability has been developed. To use the emergency message sending capability, it is necessary to register in advance a recipient phone number, an emergency message, and the number of times the mobile terminal should repeat emergency message transmission.

In a dangerous or emergency situation, pressing a predetermined button multiple times enables transmission of the emergency message to a user associated with the registered recipient phone number. When the receiving user receiving the emergency message then makes a call connection to the sending user, the receiving user can be made aware of the emergency situation of the sending user.

However, even with transmission of an emergency message, the receiving user may be of little help to the sending user if the receiving user is incapable of aiding the sending user (for example, as a result of a great separation distance).

Further, after transmission of an emergency message, the receiving user may also be of little help to the sending user if the sending user cannot answer a call from the receiving user.

SUMMARY OF THE INVENTION

The present invention has been made in view of the above problems, and an object of the present invention is to provide a method and mobile terminal wherein an emergency message is transmitted to a proximate user for immediate help.

Another object of the present invention is to provide a method and mobile terminal wherein emergency situations of a user carrying the mobile terminal can be transmitted to a mobile terminal receiving an emergency message and a Bluetooth®-enabled device near the user.

In accordance with the present invention, there is provided a mobile terminal capable of emergency message transmission using Bluetooth® technology, including a memory unit for storing a recipient list and a pre-composed emergency message; an input unit for inputting a command of emergency message transmission; a Bluetooth® module for discovering Bluetooth®-enabled devices within Bluetooth® range and for extracting a Bluetooth® address of the discovered Bluetooth®-enabled device when a Bluetooth®-enabled device is discovered; a controller for inserting the extracted Bluetooth® address into the emergency message; and a communication unit for transmitting the emergency message to a mobile terminal associated with the stored recipient list in response to input of a command of emergency message transmission.

In accordance with the present invention, there is also provided an emergency message transmission method for a Bluetooth®-enabled mobile terminal, including storing a recipient list and a pre-composed emergency message; discovering Bluetooth®-enabled devices within Bluetooth® range, and extracting a Bluetooth® address of the discovered Bluetooth®-enabled device when a Bluetooth®-enabled device is discovered; inserting the extracted Bluetooth® address into the emergency message; and transmitting the emergency message to a mobile terminal associated with the stored recipient list in response to input of a command of emergency message transmission.

In a feature of the present invention, an emergency message is transmitted to a proximate Bluetooth®-enabled device for immediate help to the user.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
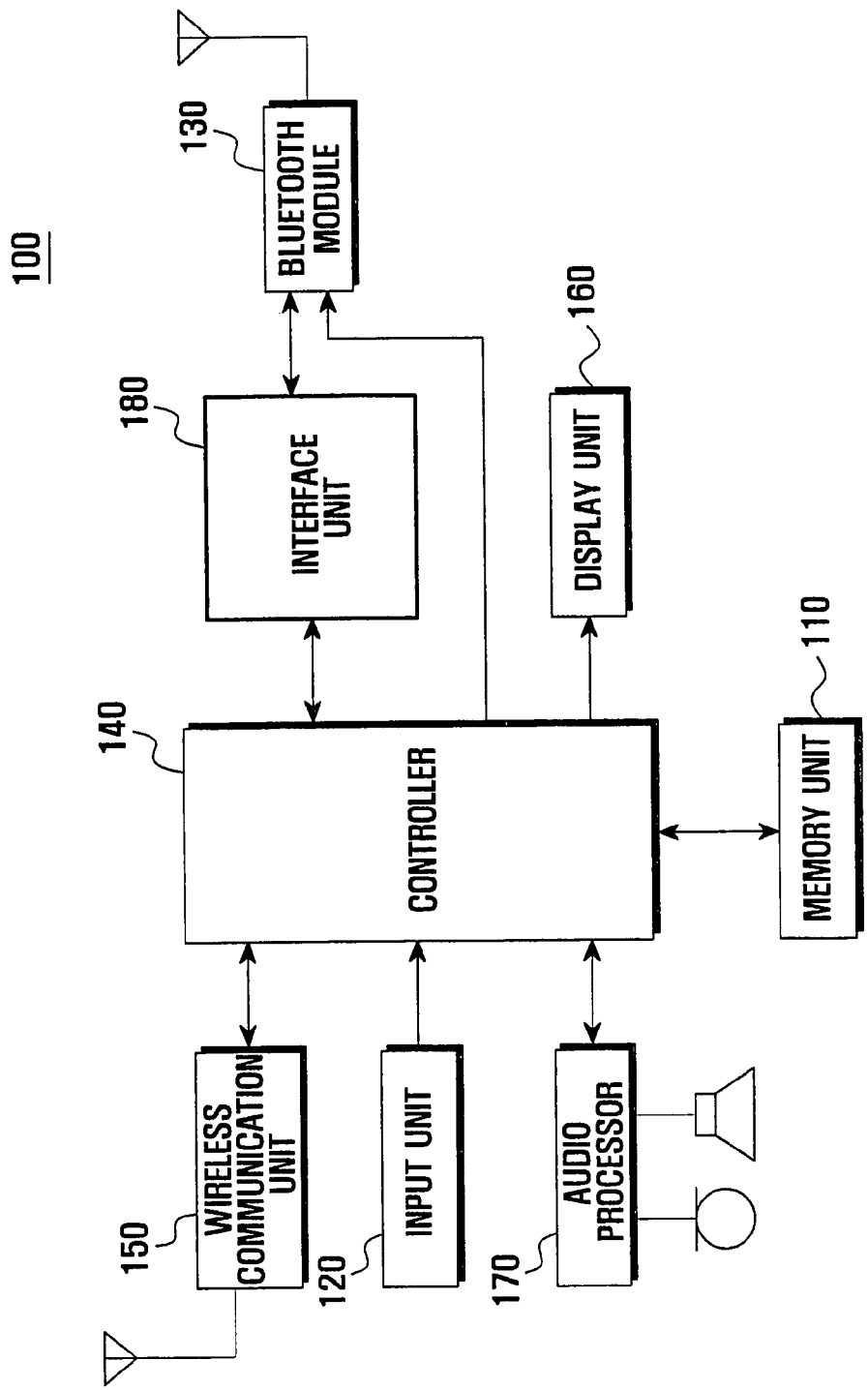
FIG. 1 illustrates a configuration of a mobile terminal including a Bluetooth® module according to the present invention.

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

The present invention is applicable to all kinds of communication devices using Bluetooth® wireless technology. Before describing the present invention, a brief description of Bluetooth® is given below.

Bluetooth® operates in a Radio Frequency (RF) band of 2.4 GHz. Bluetooth® enables communication in the presence of obstacles, and can support data rates of 1 Mbps-10 Mbps and cover a short range of 10-100 m. In these respects, Bluetooth® is considered to have an advantage over Infrared Data Association (IrDA) technology. Bluetooth® can support high-speed data exchange with low power consumption, and ensure security in data transmission.

Bluetooth® communication technology provides a point-to-point connection or a point-to-multipoint connection. In a point-to-multipoint connection, multiple Bluetooth®-enabled devices share an identical channel and form a piconet. In a piconet, a Bluetooth®-enabled device initiating communication acts as a master and other Bluetooth®-enabled devices act as slaves. The master controls channel access of the slaves. Multiple piconets having overlapping coverage areas may form a scatternet, in which a master in one piconet acts as a slave in another piconet.

Various Bluetooth® protocols and profiles are defined for transmission of voice signals and various data. For example, the Telephony Control Specification-BINary (TCS BIN) is a protocol that defines call control signaling for establishment of speech and data calls between Bluetooth®-enabled devices. The TCS BIN includes a Call Control (CC) module, Group Management (GM) module, ConnectionLess (CL) TCS module, and protocol discrimination module.

In an InterCom Profile (ICP), a TCS-based profile, a connection-oriented channel is used for a signaling path, and a synchronous connection-oriented (SCO) link is used to carry speech data.

In a TCS-based profile, the following call states are defined: null, active, disconnect request, call initiated, overlap sending, outgoing call proceeding, call delivered, call present, call received, connect request, incoming call proceeding, and overlap receiving.

A Bluetooth®-enabled device has a unique address. In the present invention, a mobile terminal including a Bluetooth® module has a corresponding Bluetooth® device address.

FIG. 1 shows a mobile terminal including a Bluetooth® module according to the present invention. The mobile terminal 100 includes a memory unit 110, an input unit 120, a Bluetooth® module 130, a controller 140, a wireless communication unit 150, a display unit 160, an audio processor 170, and an interface unit 180.

The memory unit 110 stores programs and related data for the operation of the mobile terminal 100 and for the control operation of the controller 140. The memory unit 110 may be composed of various memory devices such as an Erasable Programmable Read Only Memory (EPROM), Static Random Access Memory (SRAM) and flash memory. In particular, the memory unit 110 stores at least one recipient list and a pre-composed emergency message for emergency message transmission. Preferably, the recipient list includes a phone number, electronic mail address, and Bluetooth® address of a Bluetooth®-enabled device.

The input unit 120 may include various devices such as a keypad and touch screen, and is used to select a desired function by the user or to input desired user information. In particular, the input unit 120 inputs a mode change command for emergency message transmission to a mobile terminal associated with the recipient list. The input unit 120 also inputs a command of emergency message transmission, preferably, corresponding to successive pressing of the volume key of a keypad four times.

The Bluetooth® module 130 enables communication according to Bluetooth® standards. A standard interface, called the Host Controller Interface (HCI), is defined between a host processor and a Bluetooth® module 130. Control commands and related responses, and user data, are exchanged in the form of HCI-compliant messages (HCI packets). HCI packets are exchanged through an RS232, Universal Serial Bus (USB), or Universal Asynchronous Receiver Transmitter (UART) connection.

HCI packets are categorized into command packets, event packets and data packets. For effective utilization of a Bluetooth® module 130, about 60 command packets are provided.

In particular, the Bluetooth® module 130 uses an inquiry procedure to discover other Bluetooth®-enabled devices in the Bluetooth® radio range. That is, the Bluetooth® module 130 periodically broadcasts an inquiry message including an identification (ID) packet to discover other Bluetooth®-enabled devices in the Bluetooth® range. A Bluetooth®-enabled device to be a slave enters into an inquiry scan state, receives the broadcast inquiry message, and responds to the inquiry message by sending a Frequency Hopping Synchronization (FHS) packet to the Bluetooth® module 130. An FHS packet includes a sender's Bluetooth® address and clock information for frequency synchronization between Bluetooth®-enabled devices.

Upon reception of an FHS packet, the Bluetooth® module 130 extracts a Bluetooth® address from the received FHS packet. Preferably, the extracted Bluetooth® address is stored in the memory unit 110. For example, after a Bluetooth® address is inserted in the stored recipient list, in response to input of a command of emergency message transmission, the Bluetooth® module 130 makes an Object Push Profile (OPP) connection or a Serial Port Profile (SPP) connection to another mobile terminal including a Bluetooth® module related to the Bluetooth® address in the recipient list, and transmits an emergency message over the OPP or SPP connection using Bluetooth® communication. An OPP connection or SPP connection may be used to transmit data such as a phonebook and photograph.

Using a received Bluetooth® address, the Bluetooth® module 130 sends a page message to the corresponding Bluetooth®-enabled device, receives a response message in reply to the page message, and sends an FHS packet. In reply to the FHS packet, the Bluetooth®-enabled device sends an ID packet. Thereby an Asynchronous Connection-Less (ACL) link is established between the Bluetooth® module 130 and Bluetooth®-enabled device for data transmission. Thereafter, for speech signal transmission, a Synchronous Connection-Oriented (SCO) link is established.

After establishment of the SCO link, the Bluetooth® module 130 activates the ICP to enable transmission and reception of speech signals to and from the receiving mobile terminal including the Bluetooth® module.

Further, a speech signal received by the wireless communication unit 150 is directed to the Bluetooth® module 130 via the interface unit 180. That is, the speech signal received by the wireless communication unit 150 is converted by the audio processor 170 into digital Pulse Code Modulation (PCM) data, which is then sent to the Bluetooth® module 130 via the interface unit 180. The Bluetooth® module 130 then transmits the PCM data to the Bluetooth® module connected to the SCO link.

Preferably, the Bluetooth® module 130 sends PCM data from the Bluetooth® module to the interface unit 180 using the TCS Bin.

The controller 140 controls overall operation and states of the mobile terminal 100, and may include a microprocessor or digital signal processor. In particular, the controller 140 inserts a Bluetooth® address of a discovered Bluetooth®-enabled device extracted by the Bluetooth® module 130 into the stored emergency message. When the user inputs a command of emergency message transmission, the controller 140 controls the wireless communication unit 150 to send the emergency message containing the Bluetooth® address to a mobile terminal associated with the stored recipient list.

The controller 140 may also insert the Bluetooth® address into the recipient list stored in the memory unit 110.

When a call arrives from the mobile terminal that received the emergency message, the controller 140 controls the wireless communication unit 150 to establish a corresponding call connection, and also controls the audio processor 170 to convert a received speech signal into digital PCM data then to output the PCM data to the interface unit 180.

The wireless communication unit 150 transmits and receives speech and control signals to and from a corresponding base station through wireless communication. The wireless communication unit 150 receives a call from a calling mobile terminal through an antenna then sends the received call to the controller 140. The wireless communication unit 150 transmits data stored in the memory unit 110 to a called mobile terminal through the antenna. In particular, when the user inputs a command of emergency message transmission through the input unit 120, the wireless communication unit 150 sends the emergency message to a mobile terminal associated with the recipient list. The recipient list preferably includes a phone number and electronic mail address for each listed recipient.

The display unit 160 displays operation states of the mobile terminal 100. Preferably, when a command of emergency message transmission is input through the input unit 120, the display unit 160 displays a screen indicating a call wait state instead of a normal wait screen.

The audio processor 170 processes a voice signal of the user input through a microphone into a form transmittable through the wireless communication unit 150. The audio processor 170 processes a voice signal received through the wireless communication unit 150 and various audio signals generated from the controller 140 into speaker-enabled output forms through a speaker. In particular, the audio processor 170 converts an analog voice signal received through the wireless communication unit 150 into digital PCM data using a vocoder. The vocoder may be a Qualcomm® code Excited Linear Prediction (QCELP) coder or Enhanced Variable Rate Coder (EVRC) for Code Division Multiple Access (CDMA) systems, and be a G.723.1 vocoder for Global System for Mobile communications (GSM) systems.

The interface unit 180 sends PCM data converted by the audio processor 170 to the Bluetooth® module 130. In particular, speech signals between the controller 140 and Bluetooth® module 130 pass through the interface unit 180. The interface unit 180 may be included in the controller 140.

Figure 2:
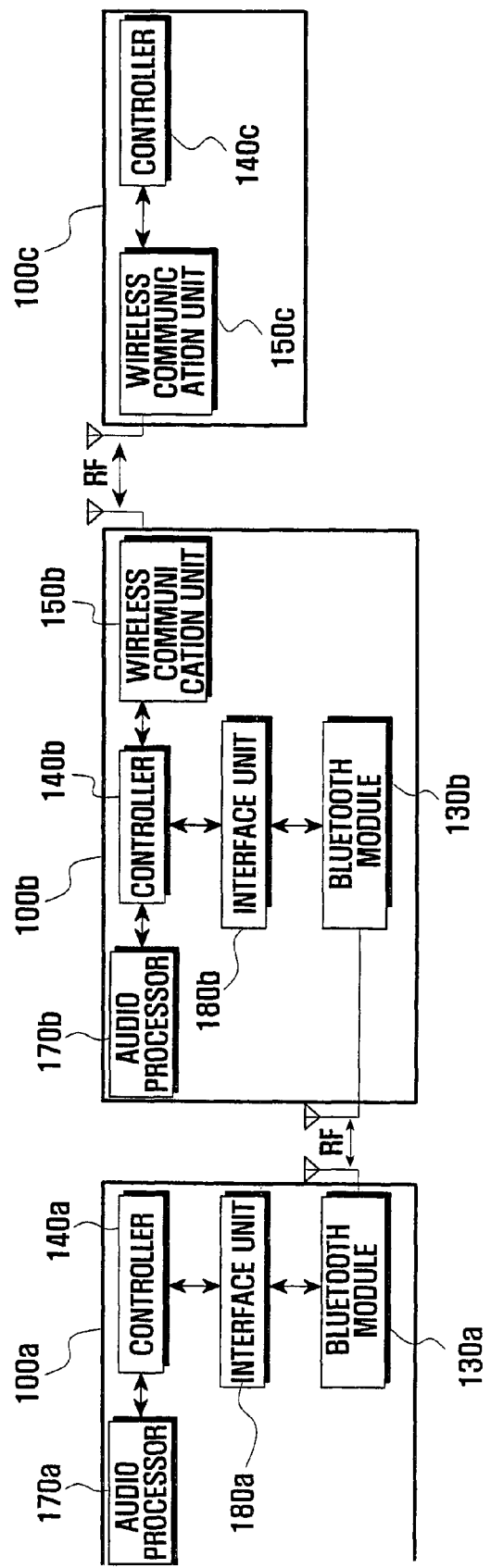
FIG. 2 is a block diagram illustrating an emergency message transmission method according to the present invention.

FIG. 2 shows an emergency message transmission method according to the present invention. Referring to FIGS. 1 and 2, an overview of the method is described below.

A mobile terminal 100b sends an emergency message to a mobile terminal 100c. In response to the emergency message, the message receiving mobile terminal 100c places a call to the message sending mobile terminal 100b. After sending the emergency message, the message sending mobile terminal 100b makes an ICP connection to a third mobile terminal 100a in the Bluetooth® range. The message sending mobile terminal 100b then receives, through a wireless communication unit 150b, an analog speech signal transmitted, through a wireless communication unit 150c, from the message receiving mobile terminal 100c. The message sending mobile terminal 100b converts the received analog speech signal into digital PCM data, and sends the PCM data through an interface unit 180b to a Bluetooth® module 130b. The Bluetooth® module 130b transmits the PCM data to a Bluetooth® module 130a of the third mobile terminal 100a using Bluetooth® communication.

Figure 3:
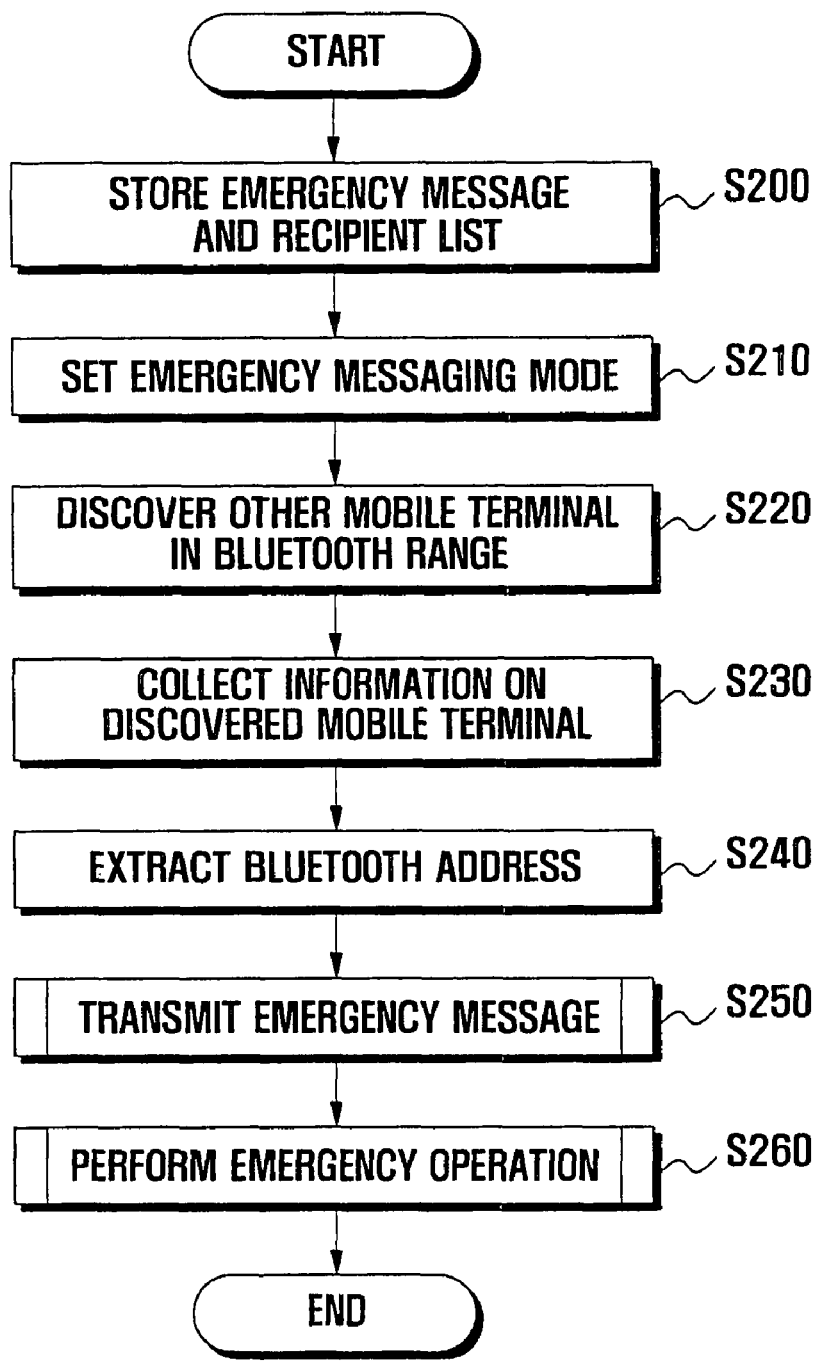
FIG. 3 is a flow chart illustrating steps of the emergency message transmission method of FIG. 2.

FIG. 3 shows steps of the emergency message transmission method of FIG. 2. Referring to FIGS. 1 and 3, the method is described below.

The controller 140 stores a pre-composed emergency, message and an associated recipient list in the memory unit 110 in step S200. The recipient list may include a phone number and an electronic mail address.

When a mode change command is input by a user, the controller 140 enters into an emergency messaging mode to prepare emergency message transmission in step S210. Thereafter, the controller 140 controls the Bluetooth® module 130 to discover other Bluetooth®-enabled mobile terminals in the Bluetooth® range, and the Bluetooth® module 130 broadcasts an inquiry message in step S220. A Bluetooth®-enabled mobile terminal to be a slave enters into an inquiry scan state, receives the broadcast inquiry message, and responds to the inquiry message by sending an FHS packet containing a sender's Bluetooth® address and clock information to the Bluetooth® module 130 in step S230.

The controller 140 extracts a Bluetooth® address from a received FHS packet in step S240.

The controller 140 transmits the emergency message using the extracted Bluetooth® address in step S250. Step S250 is described later in relation to FIGS. 4 and 5.

After emergency message transmission, the controller 140 controls performance of an emergency operation related to the emergency message in step S260. Step S260 is described later in relation to FIG. 6.

Figure 4:
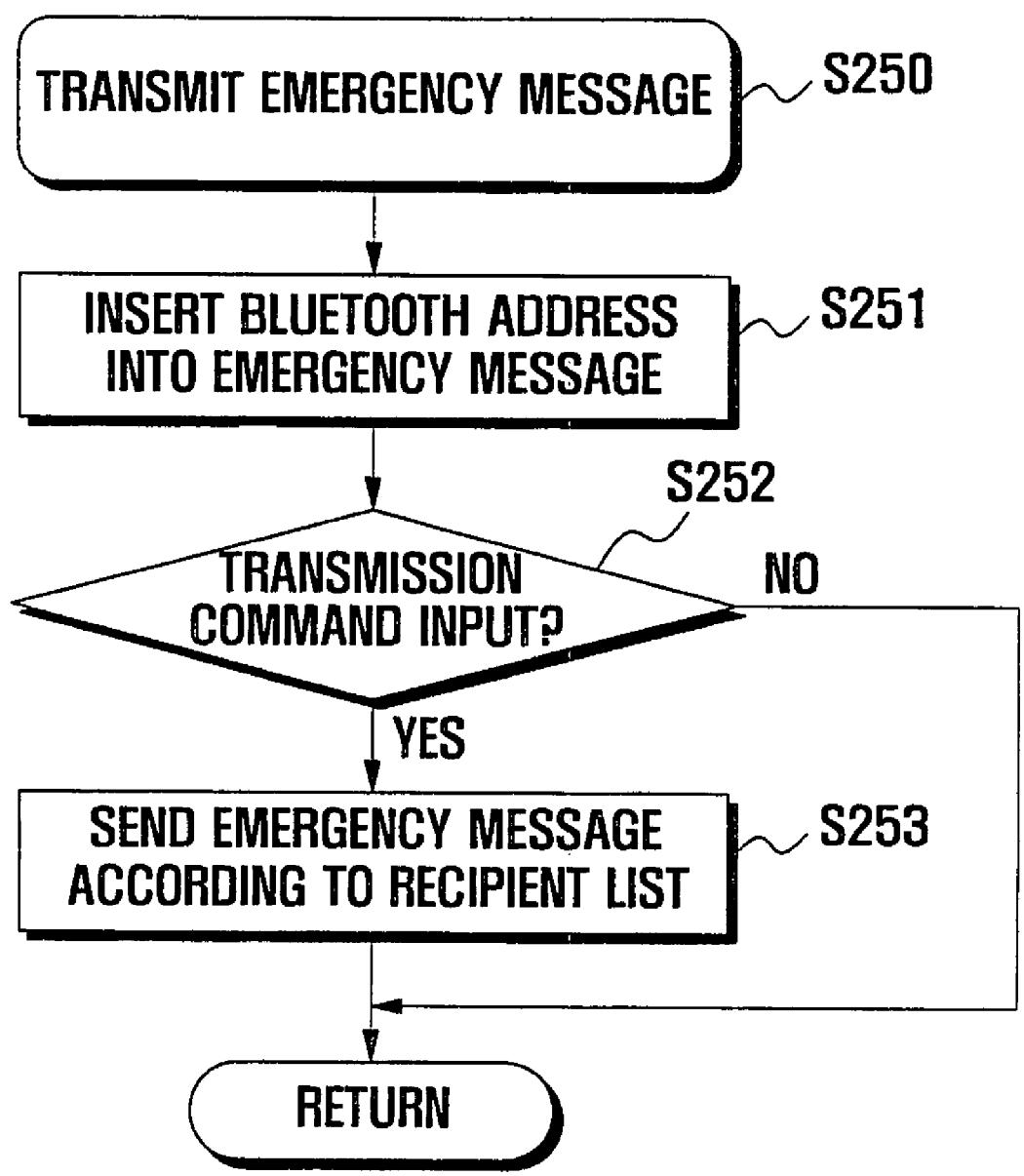
FIG. 4 is a flow chart illustrating an example of an emergency message transmission step in the method of FIG. 3.

FIG. 4 shows an example of the emergency message transmission step S250 in FIG. 3. Referring to FIGS. 1 and 4, the step is described below.

The controller 140 inserts the extracted Bluetooth® address into the emergency message stored in the memory unit 110 in step S251. The controller 140 determines whether a command of emergency message transmission is input in step S252. If a command of emergency message transmission is input, the controller 140 sends the emergency message to a mobile terminal related to the stored recipient list in step S253.

Figure 5:
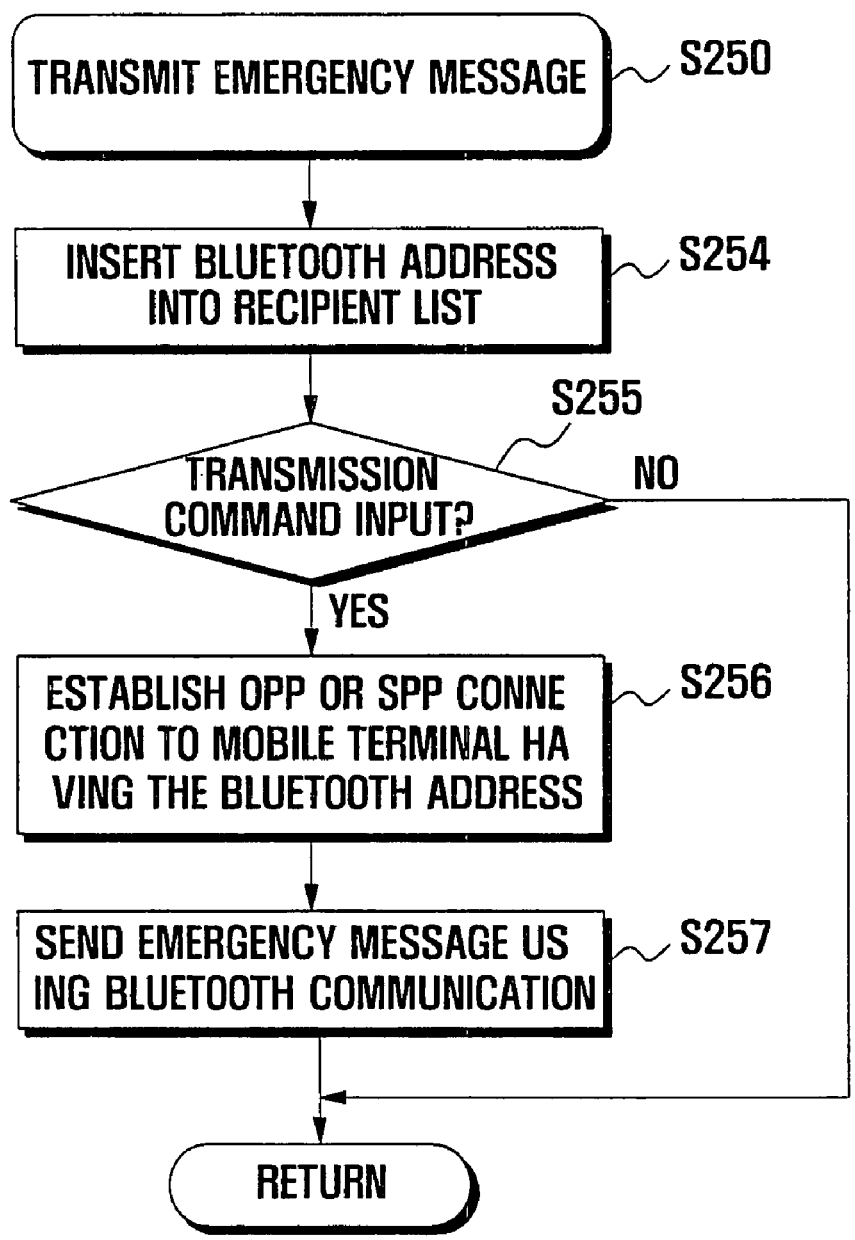
FIG. 5 is a flow chart illustrating another example of an emergency message transmission step in the method of FIG. 3.

FIG. 5 shows another example of the emergency message transmission step S250 in FIG. 3. Referring to FIGS. 1 and 5, the step is described below.

The controller 140 inserts the extracted Bluetooth® address into the recipient list stored in the memory unit 110 in step S254. The controller 140 determines whether a command of emergency message transmission is input in step S255. If a command of emergency message transmission is input, the controller 140 controls the Bluetooth® module 130 to establish an OPP connection or an SPP connection to a mobile terminal corresponding to the extracted Bluetooth® address in step S256. The OPP connection or SPP connection may be used to transmit data such as a phonebook and photograph. The controller 140 then controls the Bluetooth® module 130 to transmit the emergency message over the OPP or SPP connection using Bluetooth® communication in step S257.

Figure 6:
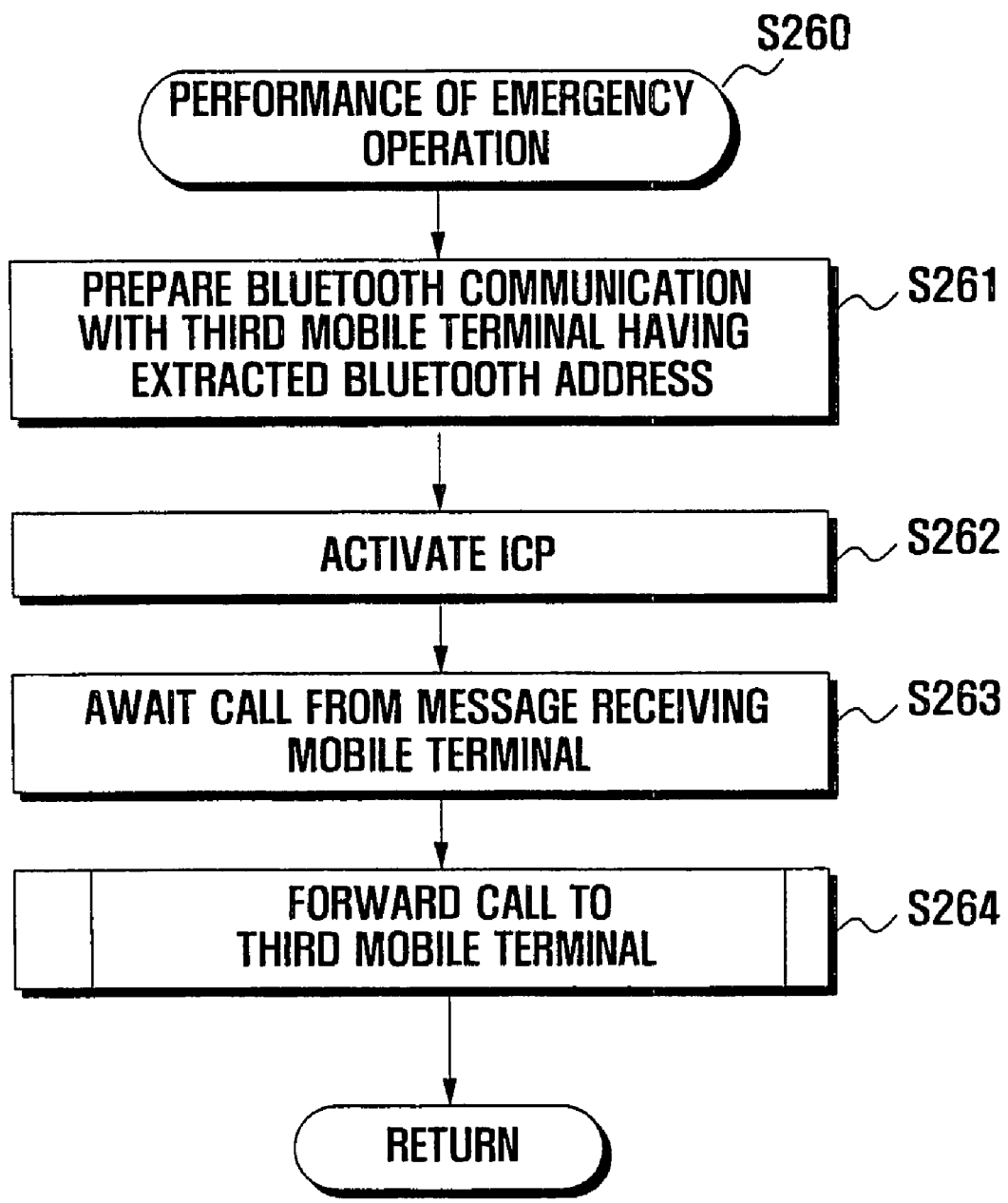
FIG. 6 is a flow chart illustrating an emergency operation step in the method of FIG. 3.

FIG. 6 shows the emergency operation step in step S260 in the method of FIG. 3. Referring to FIGS. 1, 2 and 6, the step is described below.

In a mobile terminal 100b sending the emergency message, a controller 140b controls a Bluetooth® module 130b to prepare, Bluetooth® communication with a third mobile terminal 100a having the extracted Bluetooth® address in step S261. That is, the controller 140b makes an ACL link to the third mobile terminal 100a for data transfer, and also makes an SCO link for voice signal transfer.

In the message sending mobile terminal 100b, the controller 140b controls the Bluetooth® module 130b to activate the ICP so that voice signals can be transmitted between the message sending mobile terminal 100b and third mobile terminal 100a using Bluetooth® communication in step S262.

After ICP activation, the message sending mobile terminal 100b awaits a phone call from a mobile terminal 100c receiving the emergency message in step S263. After call arrival, the message sending mobile terminal 100*b* forwards a speech signal received from the message receiving mobile terminal 100*c* to the third mobile terminal 100*a* in step S264. Step S264 is described below.

Figure 7:
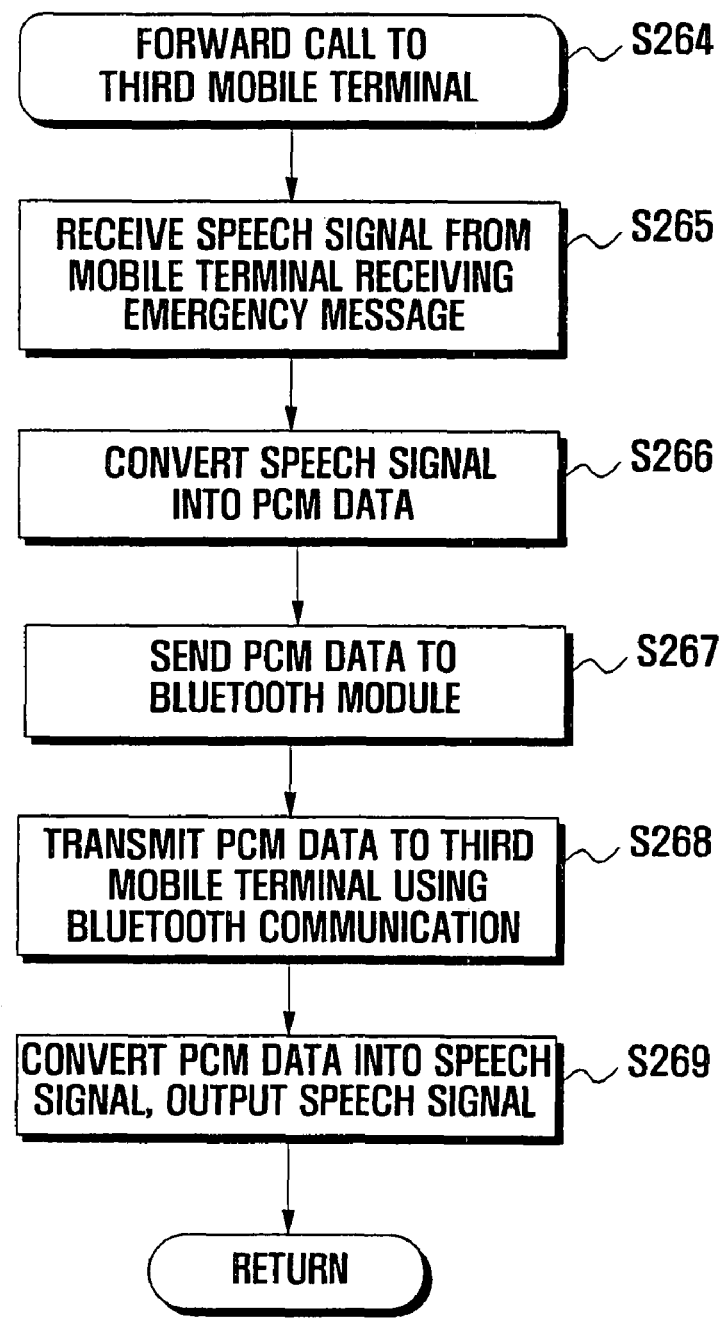
FIG. 7 is a flow chart illustrating a step of call forwarding in FIG. 6.

FIG. 7 shows the step of call forwarding S264 in FIG. 6. Referring to FIGS. 1, 2 and 7, the step is described below.

The message sending mobile terminal 100*b* receives a speech signal from the message receiving mobile terminal 100*c* in step S265. In the message sending mobile terminal 100*b*, the controller 140*b* controls the audio processor 170*b* to convert the received speech signal into digital PCM data using a vocoder in step S266. That is, the received analog speech signal is converted into digital PCM data through demodulation and decompression operations of the audio processor 170*b* using a vocoder such as an EVRC or QCELP coder.

The controller 140*b* sends the PCM data through the interface unit 180*b* to the Bluetooth® module 130*b* in step S267. That is, under the control of the controller 140*b*, the PCM data passes through a PCM_out port of the controller 140*b* to a PCM_in port of the Bluetooth® module 130*b*.

The controller 140*b* controls the Bluetooth® module 130*b* to transmit the PCM data to the third mobile terminal 100*a* using Bluetooth® communication in step S268. In the third mobile terminal 100*a*, the Bluetooth® module 130*a* receives the PCM data and sends the received PCM data to the controller 140*a* through the interface unit 180*a*. The controller 140*a* controls the audio processor 170*a* to convert the PCM data into an analog speech signal, to amplify the speech signal, and to output the amplified speech signal to a speaker in step S269.

Further, in the third mobile terminal 100*a*, the controller 140*a* controls the audio processor 170*a* to convert an analog speech signal input through a microphone into digital PCM data, and sends the PCM data through the interface unit 180*a* to the Bluetooth® module 130*a*. The controller 140*a* controls the Bluetooth® module 130*a* to transmit the PCM data to the message sending mobile terminal 100*b* using Bluetooth® communication. In the message sending mobile terminal 100*b*, the Bluetooth® module 130*b* receives the PCM data and sends the PCM data to the controller 140*b* through the interface unit 180*b* using the TCS Bin. The controller 140*b* controls the audio processor 170*b* to convert the PCM data into an analog speech signal, and also controls the wireless communication unit 150*b* to transmit the speech signal to the message receiving mobile terminal 100*c*.

As apparent from the above description, the present invention provides an emergency message transmission method and a mobile terminal using a Bluetooth® module, wherein an emergency message is transmitted to a proximate Bluetooth®-enabled mobile terminal. In addition, when a call is connected between a mobile terminal sending an emergency message and another mobile terminal receiving the emergency message, a third mobile terminal near to the sending mobile terminal can exchange speech signals with the receiving mobile terminal through the intermediation of the sending mobile terminal. As a result, a proximate person can rapidly help the user sending an emergency message.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A mobile terminal capable of emergency message transmission using short range Radio Frequency (RF) technology that provides a point-to-point connection or a point-to-multipoint connection that lacks an administrative function for operating as a network, comprising:

a memory unit for storing a recipient list and a pre-composed emergency message;

an input unit for inputting a command of emergency message transmission;

an RF module for discovering RF-enabled devices within range and for extracting an address of the discovered RF-enabled device when an RF-enabled device is discovered;

a controller for inserting the extracted address into the emergency message; and a communication unit for transmitting the emergency message to a mobile terminal associated with the stored recipient list in response to input of a command of emergency message transmission.

2. The mobile terminal of claim 1, wherein the input unit inputs a mode change command for emergency message transmission.

3. The mobile terminal of claim 1, wherein the controller inserts the extracted address into the recipient list, and wherein the RF module transmits the emergency message to an RF-enabled device having an RF address in the recipient list using point-to-point connection or a point-to-multipoint communication in response to input of the command of emergency message transmission.

4. The mobile terminal of claim 1, wherein the RF module establishes a communication link to an RF module of an RF-enabled device having the extracted address for point-to-point connection or a point-to-multipoint communication, and each RF module activates an Intercom Profile for speech signal transmission and reception.

5. The mobile terminal of claim 4, wherein the RF module establishes a communication link to an RF module of an RF-enabled device having an address satisfying a preset condition when multiple addresses are extracted.

6. The mobile terminal of claim 5, wherein the preset condition is selection of an earliest extracted one of the multiple addresses.

7. The mobile terminal of claim 5, further comprising an interface unit for intermediating speech signals between the RF module and controller, and wherein the controller controls the communication unit to send a speech signal received from the mobile terminal receiving the emergency message to the interface unit when a call is received from the mobile terminal receiving the emergency message.

8. The mobile terminal of claim 7, wherein the RF module transmits the received speech signal to the RF-enabled device connected to the communication link using point-to-point connection or a point-to-multipoint communication.

9. The mobile terminal of claim 8, wherein the RF module sends the received speech signal to the interface unit according to a control signal for speech signal transfer when a speech signal is received using RF communication from the RF-enabled device connected to the communication link.

10. An emergency message transmission method for a mobile terminal enabled for point-to-point connection or a point-to-multipoint communication that lacks an administrative function for operating as a network, the method comprising:

storing a recipient list and a pre-composed emergency message;

discovering RF-enabled devices within range, and extracting an address of a discovered RF-enabled device when an RF-enabled device is discovered;

inserting the extracted address into the emergency message; and transmitting the emergency message to a mobile terminal associated with the stored recipient list in response to input of a command of emergency message transmission.

11. The emergency message transmission method of claim 10, further comprising changing an operation mode to an emergency message transmission mode in response to input of a mode change command.

12. The emergency message transmission method of claim 10, further comprising inserting the extracted address into the recipient list, and wherein the transmitting the emergency message step transmits the emergency message to an RF-enabled device having the inserted address in the recipient list using point-to-point connection or a point-to-multipoint communication in response to input of a command of emergency message transmission.

13. The emergency message transmission method of claim 10, further comprising forwarding a call from the mobile terminal receiving the emergency message to an RF-enabled device having the extracted address.

14. The emergency message transmission method of claim 13, wherein the forwarding a call step comprises:
establishing a communication link between the mobile terminal sending the emergency message and RF-enabled device having the extracted address for point-to-point connection or a point-to-multipoint communication;

activating communication profiles for speech signal transmission and reception, respectively, at the mobile terminal sending the emergency message and the RF-enabled device; and transferring a speech signal therefrom to the RF-enabled device after reception of a call from the mobile terminal receiving the emergency message.

15. The emergency message transmission method of claim 14, wherein the establishing a communication link step makes a communication link between the mobile terminal sending the emergency message and an RF-enabled device having an address satisfying a preset condition when multiple addresses are extracted.

16. The emergency message transmission method of claim 15, wherein the preset condition is selection of an earliest extracted one of the multiple addresses.

17. The emergency message transmission method of claim 14, wherein the transferring a speech signal step comprises:
sending, by the mobile terminal receiving the emergency message, a speech signal to the mobile terminal sending the emergency message;
converting, by the mobile terminal sending the emergency message, the received speech signal into Pulse Code Modulation (PCM) data; and
sending, by the mobile terminal sending the emergency message, the PCM data to the enabled device having the extracted address using point-to-point connection or a point-to-multipoint communication.

* * * * *